(12) United States Patent
Bowen et al.

(10) Patent No.: US 7,596,800 B2
(45) Date of Patent: Sep. 29, 2009

(54) SYSTEM AND METHOD FOR ASSIGNING AND VERIFYING CPE SERVICE CALLS IN A CABLE NETWORK

(75) Inventors: Todd P. Bowen, Austin, TX (US); William H. Berger, Austin, TX (US)

(73) Assignee: Time Warner Cable, Inc., Stamford, CT (US)

(*) Notice: Subject to any disclaimer, the term of this patent is extended or adjusted under 35 U.S.C. 154(b) by 592 days.

(21) Appl. No.: 11/216,329

(22) Filed: Aug. 31, 2005

(65) Prior Publication Data
US 2007/0074261 A1 Mar. 29, 2007

(51) Int. Cl.
| H04N 7/173 | (2006.01) |
| G01D 3/00 | (2006.01) |
| G01M 19/00 | (2006.01) |
| G01P 21/00 | (2006.01) |
| G01R 27/28 | (2006.01) |
| G01R 31/00 | (2006.01) |
| G01R 31/14 | (2006.01) |

(52) U.S. Cl. .................. 725/107; 725/129; 702/108; 702/119; 702/122; 702/123; 705/9

(58) Field of Classification Search .............. 725/107, 725/125, 129; 702/108, 119, 122, 123; 705/8, 705/9, 11
See application file for complete search history.

(56) References Cited

U.S. PATENT DOCUMENTS

| 5,432,542 A | 7/1995 | Thibadeau et al. |
| 5,666,481 A | 9/1997 | Lewis |
| 5,884,284 A | 3/1999 | Peters et al. |
| 5,987,135 A | 11/1999 | Johnson et al. |
| 6,000,045 A | 12/1999 | Lewis |
| 6,272,150 B1 | 8/2001 | Hrastar et al. |
| 6,393,478 B1 | 5/2002 | Bahlmann |
| 6,425,132 B1* | 7/2002 | Chappell .................. 725/107 |
| 6,481,011 B1 | 11/2002 | Lemmons |
| 6,526,582 B1 | 2/2003 | Brodigan et al. |
| 6,598,057 B1 | 7/2003 | Synnestvedt et al. |
| 6,704,288 B1 | 3/2004 | Dziekan et al. |
| 6,769,127 B1 | 7/2004 | Bonomi et al. |
| 6,898,800 B2 | 5/2005 | Son et al. |
| 6,947,980 B1 | 9/2005 | Knudsen et al. |
| 7,111,318 B2* | 9/2006 | Vitale et al. ................. 725/107 |
| 7,188,116 B2 | 3/2007 | Cheng |
| 7,227,889 B1* | 6/2007 | Roeck et al. ................ 375/222 |
| 7,251,820 B1 | 7/2007 | Jost et al. |
| 7,290,046 B1 | 10/2007 | Kumar |
| 7,313,749 B2 | 12/2007 | Nerl et al. |
| 7,343,614 B1 | 3/2008 | Hendricks et al. |
| 2001/0034852 A1* | 10/2001 | Kawashima .................... 714/4 |
| 2002/0019983 A1* | 2/2002 | Emsley et al. ............... 725/107 |
| 2002/0061012 A1 | 5/2002 | Thi et al. |
| 2002/0109879 A1 | 8/2002 | Wing So |
| 2002/0136165 A1 | 9/2002 | Ady et al. |
| 2002/0143775 A1 | 10/2002 | Wilkinson et al. |
| 2003/0020765 A1 | 1/2003 | Kussmaul et al. |
| 2003/0028891 A1 | 2/2003 | Hardt et al. |
| 2003/0036848 A1 | 2/2003 | Sheha et al. |
| 2003/0040936 A1 | 2/2003 | Nader et al. |
| 2003/0145075 A1* | 7/2003 | Weaver et al. ............... 709/223 |

(Continued)

Primary Examiner—Joseph G Ustaris
(74) Attorney, Agent, or Firm—The Marbury Law Group PLLC (57) ABSTRACT

A system for validating two-way continuity of a customer premises equipment (CPE) unit in a hybrid fiber coax (HFC) cable network. A two-way client uses a two-way query interface to acquire information indicative of the two-way operational status of a subscriber CPE units from a two-way validation server and to display the information graphically.

29 Claims, 6 Drawing Sheets

U.S. PATENT DOCUMENTS

| | | |
|---|---|---|
| 2003/0163831 A1 | 8/2003 | Gall et al. |
| 2003/0167319 A1 | 9/2003 | Venkatesulu et al. |
| 2004/0008761 A1 | 1/2004 | Kelliher et al. |
| 2004/0044554 A1* | 3/2004 | Bull et al. .................. 705/8 |
| 2004/0054771 A1 | 3/2004 | Roe et al. |
| 2004/0111311 A1* | 6/2004 | Ingman et al. ............... 705/9 |
| 2004/0120250 A1 | 6/2004 | Langevin et al. |
| 2005/0039213 A1 | 2/2005 | Matarese et al. |
| 2005/0111063 A1* | 5/2005 | Shar et al. .................. 358/514 |
| 2005/0144641 A1 | 6/2005 | Lewis |
| 2005/0183130 A1 | 8/2005 | Sadja et al. |
| 2005/0204290 A1* | 9/2005 | Eddy et al. .................. 715/733 |
| 2005/0286466 A1 | 12/2005 | Tagg et al. |

* cited by examiner

FIGURE 1

200
WORK ORDER LIST

| 205<br>WORK ORDER | 210<br>ACCT NUMBER | 215<br>STATUS |
|---|---|---|
| 12345600 | 987654305 | CP |
| 12345601 | 987654412 | CN |
| 12345608 | 987655200 | CP |
| 12345615 | 987663450 | ND |
| 12345624 | 987656798 | CN |
| 12345631 | 987743340 | INCOMPLETE |
| 12345644 | 987855550 | CN |
| 12345660 | 987877655 | CP |

FIGURE 2

| 300 WORK ORDER RECORD ||
|---|---|
| 305 WO # | 12345631 |
| 310 ACCOUNT | 987743340 |
| 315 ADDRESS | 12 ELM STREET MY TOWN, USA |
| 320 POOL | A |
| 325 NODE | F18 |
| 330 COMMENTS | CTME 965 0811 AS EARLY AS POSSIBLE RX-3 TX 0 SNR 25 HIT/MISS=2976/1117 RESCHEDULED FROM 04/01/05 SLOT 2 |

600 DIAGNOSTICS

| 605 DEVICE MAC | VALUE |
|---|---|
| 610 TRANSMIT SIGNAL LEVEL | VALUE |
| 615 RECEIVE SIGNAL LEVEL | VALUE |

620 UPTIME

| | |
|---|---|
| DAYS | VALUE |
| HOUR | VALUE |
| MINUTES | VALUE |
| SECONDS | VALUE |

FIGURE 6

SYSTEM AND METHOD FOR ASSIGNING AND VERIFYING CPE SERVICE CALLS IN A CABLE NETWORK

BACKGROUND

Embodiments of this invention are generally related to cable network diagnostics and more particularly related to enabling a cable service technician (CST) to confirm the two-way operation of customer premises equipment (CPE).

Cable networks have evolved from downstream broadcast systems provided over coax cable to hybrid fiber cable (HFC) networks capable of both downstream and upstream (two-way) communications using both analog and digital signals. With respect to video services, modern set top boxes send upstream signals to the headend to request video on demand (VOD) services pay per view (PPV) services, and switched video broadcast (SVB) services and to issue control commands (play, stop, fast forward, rewind, and pause) that affect the video stream. Two-way STBs are addressable, can be associated with a subscriber, and can be associated with a physical location with an HFC cable network.

Cable modems and media terminal adapters (MTAs) are also two-way devices that depend on both downstream and upstream continuity for exchanging data packets with cable system network components and with other users of the cable system.

The operation of a CPE unit in the two-way mode depends on a number of factors. The CPE unit must be correctly associated with its subscriber. Typically, the CPE identifying information is the MAC address of the device. For example, if the MAC address of the CPE unit is incorrect or not associated with the subscriber, the CPE unit will not be recognized by the cable network and will fail to operate in a two-way mode. A CPE unit may also fail to operate in a two-way mode if the CPE unit is not properly provisioned. Further, a CPE unit may receive downstream communications but be unable to provide upstream communications because of problems external to the CPE unit. By way of illustration, upstream communications may be disrupted because of problems with the inside cabling (e.g., the inside cable has been split multiple times), because the CPE reverse data carrier (RDC) signal level is too low, or because of problems with network devices that support upstream communications.

Problems with two-way communications are a major source of customer service requests and maintenance expenses. While many such requests are valid problems with subscriber CPE, a significant number of such requests do not require technical support, are caused by failures in the outside plant and not the subscriber CPE, or are made by subscribers who are not authorized for the support requested. Additionally, the complexities of two-way communications sometimes lead to a valid service request being assigned to an over-qualified or under-qualified CST.

While maintenance and support of subscriber CPE is a cost of cable system operation, reducing the demand for support services and using support service resources effectively improves both the customer experience and the profitability of system operation.

What would be useful are tools that reduce or eliminate unnecessary service calls to a subscriber location by providing information to cable service technicians to qualify a service request relating to subscriber CPE before a service call is initiated and to verify the operation of the subscriber CPE in the two-way mode after a service call is completed.

SUMMARY

According to an embodiment of the present invention, a two-way analysis system comprises a two-way client and a two-way validation server. The two-way client uses a two-way query interface (herein, "TWQI") to acquire information indicative of the two-way operational status of a subscriber CPE unit from the two-way validation server and to display the information graphically. In this embodiment, the two-way client comprises the TWQI, a processor, a display, a user input, and a LAN interface. According to an embodiment of the present invention, the processor, the display, the user input, and the LAN interface functions of the two-way client are provided by a general purpose computing device, the TWQI functionality is provided by a Web browser, and the two-way validation server operates a Web server.

In an exemplary embodiment of the present invention, the LAN comprises a wireless network interface and the general purpose computer comprises a portable computing device.

The two-way client interacts with the two-way validation server to acquire information relating to a list of work orders associated with a cable service technician (CST), a work order associated with a subscriber the two-way CPE units associated with that subscriber, and the two-way operational status of the associated CPE units.

In an exemplary embodiment of the present invention, the CST uses the two-way client to remotely evaluate a service request for two-way CPE units prior to initiating a service call. In this embodiment, a service request is evaluated against the subscriber account to verify that the subscriber is entitled to two-way service. If the service request is validated, the CST uses the two-way client to direct the two-way validation server to "PING" the subscriber's CPE units to confirm that the service request accurately describes the two-way status of the subscriber CPE units.

In another embodiment of the present invention, a determination is made whether the CST assigned the service call is qualified to provide the service necessary to restore subscriber CPE to two-way operation and/or if the CST is too busy to respond to the service call. If either condition occurs, the service call is reassigned to an available CST who is qualified to perform the work necessary to restore the subscriber's CPE.

In another embodiment of the present invention, following completion of a service or installation call, the two-way client is used to confirm that the subscriber's CPE units are operating in a two-way mode.

The two-way analysis system further provides the CST the option of recording a time-stamped report of the confirmed two-way operation of the subscriber CPE units in the subscriber record in a billing system.

It is therefore an aspect of the present invention to provide a CST a system and method to validate a service request from a subscriber before visiting the subscriber's premises.

It is another aspect of the present invention to determine that the service request accurately describes the two-way performance of the subscriber's CPE units by determining the two-way connectivity of those units before visiting the subscriber's premises.

In yet another aspect of the present invention to determine whether the CST assigned to the service request is qualified to provide the services described in the service request before visiting the subscriber's premises, and if the CST is not qualified to perform the required services, to assign the service request to a qualified CST.

It is still another aspect of the present invention to determine whether the CST assigned to the service request has sufficient time to complete the service request within the time allowed, and, if the CST cannot perform the required services within the time allowed, then assigning the service request to a qualified CST It is another aspect of the present invention to document the performance of the two-way operation of a subscriber's CPE units and to retain that documentation in a subscriber record in a billing system for future access.

It is yet another aspect of the present invention to notify the supervisor of a CST who does not confirm two-way operation of a subscriber's CPE before leaving a subscriber's premises.

These and other aspects of the present invention will become apparent from a review of the description that follows.

In an embodiment of the present invention, a system for validating two-way continuity of CPE unit in a hybrid fiber coax (HFC) cable network comprises a two-way query library, a job query library, a two-way query processor, a result analyzer, and a display server. By way of illustration and not as a limitation, the CPE unit may be, without limitation, selected from the group consisting of a set top box, a cable modem, a media terminal adapter, and a digital video recorder. In this embodiment, the two-way query library comprises validation instructions for validating the two-way operation of the CPE unit.

By way of illustration and not as a limitation, according to an embodiment of the present invention, the validation instructions comprise instructions for issuing a PING command to the CPE unit. A response indicative of two-way continuity comprises a reply to the PING command. A response indicative of a failure of two-way continuity comprises a timeout of the PING command.

The job query library comprises instructions for acquiring work orders assigned to a cable service technician (CST). A work order comprises a subscriber account identifier associated with CPE units assigned to the subscriber. In yet another embodiment of the present invention, a work order comprises a link associating the work order with work order data. Work order data comprises a work order identifier, the subscriber account identifier, a subscriber address, a VOD pool identifier, a cable node identifier, and a comment.

The two-way query processor receives a query from a CST, executes the instructions from the job query library, and receives a work order assigned to the CST. According to an embodiment of the present invention, the query from the CST comprises a CST identifier associated with the CST, and the work order is associated with the CST via the CST identifier.

In response to selection by the CST of the subscriber identifier associated with the work order, the two-way query processor executes the validation instructions from the two-way query library to determine the two-way continuity of a CPE unit associated with the subscriber account identifier.

The results analyzer receives a response from the CPE unit to the validation instructions. If the response from the CPE unit is indicative of two-way continuity, then the results analyzer assigns the CPE unit a two-way status value indicative of two-way continuity. If the response from the CPE unit is indicative of a failure of two-way continuity, then the results analyzer assigns the CPE unit the two-way status value indicative of a failure of two-way continuity. The results analyzer further provides a MAC address of the CPE unit and the assigned two-way status value to a display server.

The display server creates a two-way response record comprising the MAC address of the CPE unit and the two-way status and sends the two-way response record to a CST client for display.

In yet another embodiment of the present invention, if the response from the CPE unit is indicative of two-way continuity, then the results analyzer assigns a first graphical attribute to the MAC address of the CPE unit. If the response from the CPE unit is indicative of a failure of two-way continuity, then the results analyzer assigns a second graphical attribute to the MAC address of the CPE unit. The display server displays the two-way record in accordance with an assigned graphical attribute.

In another embodiment of the present invention, the system further comprises a signature query library. The signature query library comprises instructions for creating a signature record comprising the response of the CPE unit, a CST identifier associated with the CST, and a timestamp comprising a time when the response was created, associating the signature record with the subscriber account identifier, and storing the signature record in a subscriber datastore. The two-way query processor receives a signature record request from the CST, and executes the instructions from the signature query library.

In still another embodiment of the present invention, the work order that is received by the two-way query processor is associated with a subscriber location. The two-way query processor determines whether the CST has left the subscriber location associated with the work order. If the CST has left the subscriber location, the two-way query processor determines whether the CST has sent the signature record request to the two-way query processor. If the CST has not sent the signature record request to the two-way query processor, then a notice is issued to a supervisor of the CST. In yet another embodiment of the present invention, the display server creates a work order record from the work order data, and sends the work order record to the CST client for display.

In an embodiment of the present invention, the MAC address of the CPE unit comprises a link associating the MAC address with CPE diagnostic data comprising a CPE unit MAC address, a transmit signal level, a receive signal level, and uptime data. The display server creates a diagnostic record from the CPE diagnostic data, and sends the diagnostic record to the CST client for display. The diagnostic record may be accessed via the MAC link.

In still another embodiment of the present invention, the job query library comprises qualification instructions for acquiring a profile of the CST comprising qualification data indicative of a skill level of the CST, and for acquiring a skill level requirement for the work order. The results analyzer receives the qualification data of the CST and the skill level requirement for the work order. The results analyzer makes a determination from qualification data of the CST whether the skill level of the CST equals or exceeds the skill level requirement of the work order. If the skill level of the CST is less than the skill level requirement of the work order, then the results analyzer reassigns the work order.

An embodiment of the present invention provides a method for validating two-way continuity of a CPE unit in a hybrid fiber coax (HFC) cable network. A query comprising a CST identifier is received from a CST. A client work order is displayed on a CST client. The work order comprises a subscriber identifier. In response to selection by the CST of the subscriber identifier, validation instructions are executed to determine the two-way continuity of a CPE unit associated with the subscriber account identifier. A response is received from the CPE unit to the validation instructions. If the response from the CPE unit is indicative of two-way continuity, then the CPE unit is assigned a two-way status value indicative of two-way continuity. If the response from the CPE unit is indicative of a failure of two-way continuity, then the CPE unit is assigned the two-way status value indicative of a failure of two-way continuity. A two-way response record comprising the MAC address of the CPE unit and the two-way status is created and displayed on the CST client.

In yet another embodiment of the present invention, if the response from the CPE unit is indicative of two-way continuity, a first graphical attribute is assigned to the MAC address of the CPE unit. If the response from the CPE unit is indicative of a failure of two-way continuity, then a second graphical attribute is assigned to the MAC address of the CPE unit. The two-way response record is displayed on the CST client in accordance with an assigned graphical attribute.

In still another embodiment of the present invention, a signature record is created. The signature record comprises the response of the CPE unit, a CST identifier associated with the CST, and a timestamp comprising a time when the response was created. The signature record is associated with the subscriber account identifier and stored in a subscriber datastore.

In an embodiment of the present invention, a work order is associated with a subscriber location. A determination is made whether the CST has left the subscriber location associated with the work order. If the CST has left the subscriber location, a determination is made whether the CST has sent the signature record request to the two-way query processor. If the CST has not sent the signature record request to the two-way query processor, then a notice is issued to a supervisor of the CST.

In another embodiment of the present invention, the query from the CST comprises a CST identifier associated with the CST. A list of work orders associated with the CST identifier is created and displayed on the CST client.

In yet another embodiment of the present invention, the work order record is created from work order data and displayed on the CST client.

In still another embodiment of the present invention, a diagnostic record is created from CPE diagnostic data and sent to the CST client for display.

In an embodiment of the present invention, a profile of the CST is acquired. The profile comprises qualification data indicative of a skill level of the CST. A skill level requirement for the work order is acquired. A determination is made from the qualification data of the CST whether the skill level of the CST equals or exceeds the skill level requirement of the work order. If the skill level of the CST is less than the skill level requirement of the work order, the work order is reassigned.

DETAILED DESCRIPTION

The following terms are used in the description that follows. The definitions are provided for clarity of understanding:

| | |
|---|---|
| CM | Cable modem. |
| CPE | Customer premises equipment. |
| HFC | Hybrid Fiber Coax. A network design that employs both fiber optic and coaxial cables to deliver cable video and data services. |
| IP address | IP address as used herein means a uniquely addressable identifier associated with network or home equipment capable of responding to a ping. |
| PING | The verb "to PING" means the act of using the ping utility or command. The ping utility sends a packet to a device with an IP address and waits for a response. The response is indicative that the ping packet was received by the device and the device is present on the network. The noun "ping" means the request for a response from a network device. |
| Poll | The verb "poll" means the act of using a utility or command by one network device to request data from another network device. |
| RDC level | Reverse data carrier level. A measure of the signal strength of the upstream signal generated by an STB or other CPE device. |
| STB | Set top box. As used herein, a STB comprises a standalone device and a device meeting the OpenCable Applications Platform Specification (OCAP), sometimes referred to as a DSG client. |
| Two-way | Describes the capability of a CPE unit to both receive signals from a cable headend or data center in the downstream direction and send signals to the headend or data center in the upstream direction. |
| VOD | Video on demand. VOD is the generic term for a collection of services such as HBO on demand (HOD), movies on demand (MODULATOR) SVOD (subscription video on demand), FOD (free on demand), and other similar services. |

According to an embodiment of the present invention, a two-way analysis system comprises a two-way client and a two-way validation server. The two-way client uses a two-way query interface (herein, "TWQI") to acquire information indicative of the two-way operational status of a subscriber CPE unit from the two-way validation server and to display the information graphically. In this embodiment, the two-way client comprises the TWQI, a processor, a display, a user input, and a LAN interface. According to an embodiment of the present invention, the processor, the display, the user input, and the LAN interface functions of the two-way client are provided by a general purpose computing device, the TWQI functionality is provided by a Web browser, and the two-way validation server operates a Web server.

In an exemplary embodiment of the present invention, the LAN comprises a wireless network interface and the general purpose computer comprises a portable computing device.

The two-way client interacts with the two-way validation server to acquire information relating to a list of work orders associated with a cable service technician (CST), a work order associated with a subscriber the two-way CPE units associated with that subscriber, and the two-way operational status of the associated CPE units.

In an exemplary embodiment of the present invention, the CST uses the two-way client to remotely evaluate a service request for two-way CPE units prior to initiating a service call. In this embodiment, a service request is evaluated against the subscriber account to verify that the subscriber is entitled to two-way service. If the service request is validated, the CST uses the two-way client to direct the two-way validation server to "PING" the subscriber's CPE units to confirm that the service request accurately describes the two-way status of the subscriber CPE units. As will be appreciated by those skilled in the art, other methods can be utilized to determine whether a CPE unit is capable of two-way communication without departing from the scope of the present invention.

In another embodiment of the present invention, a determination is made whether the CST assigned the service call is qualified to provide the service necessary to restore subscriber CPE to two-way operation and/or if the CST is too busy to respond to the service call. If either condition occurs, the service call is reassigned to an available CST who is qualified to perform the work necessary to restore the subscriber's CPE.

In another embodiment of the present invention, following completion of a service or installation call, the two-way client is used to confirm that the subscriber's CPE units are operating in a two-way mode.

The two-way analysis system further provides the CST the option of recording a time-stamped report of the confirmed two-way operation of the subscriber CPE units in the subscriber record in a billing system.

Figure 1:
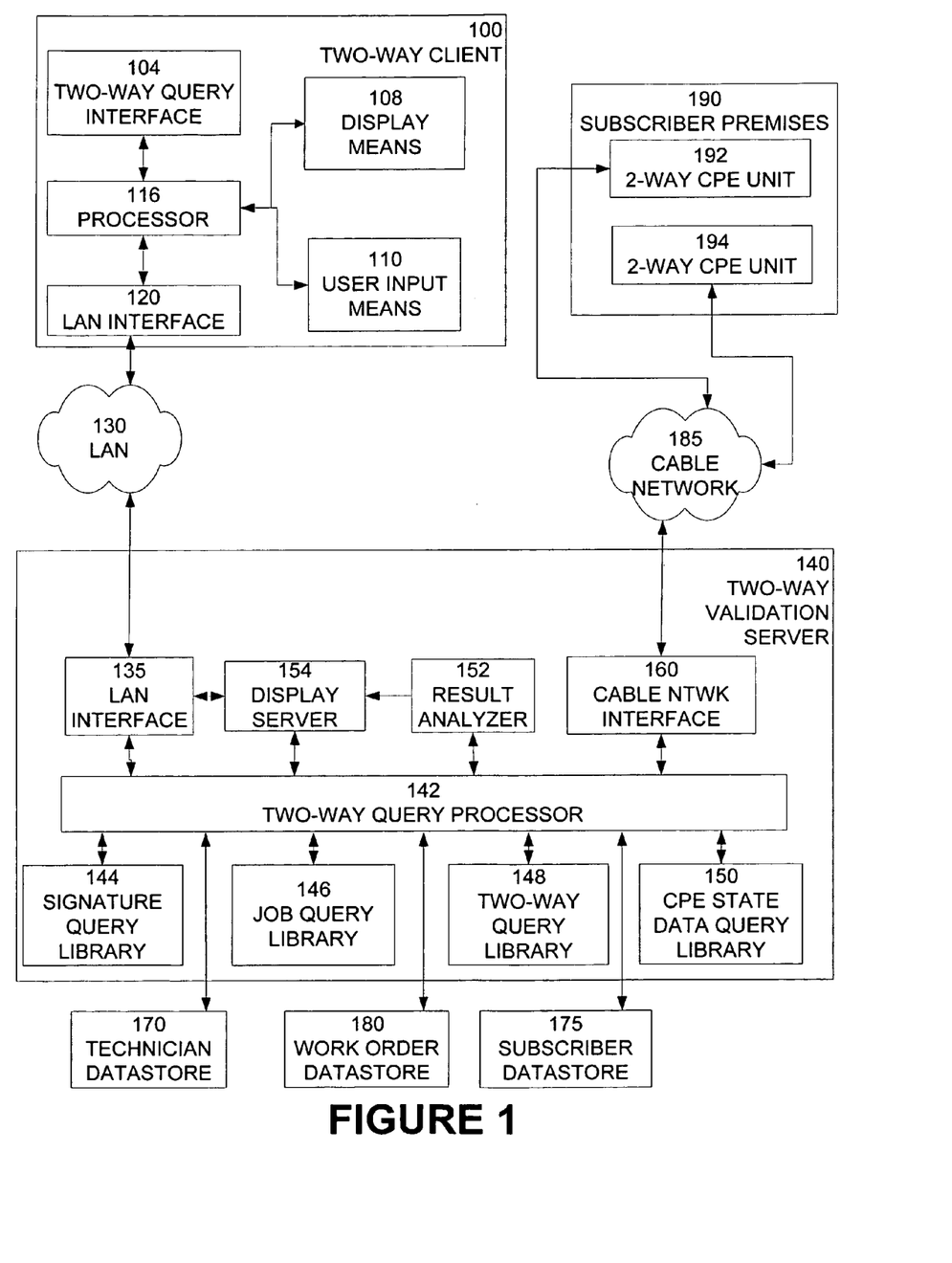
FIG. 1 illustrates the components of a remote two-way analysis system in a cable network environment according to an embodiment of the present invention.

FIG. 1 illustrates the components of a remote two-way analysis system in a cable network environment according to an embodiment of the present invention. Referring to FIG. 1, a two-way analysis system comprises a two-way client 100 and a two-way validation server 140. Two-way client 100 comprises a two-way query interface (TWQI) 104, a display 108, a user input 110, a processor 116 and a LAN interface 120.

In an exemplary embodiment, LAN interface 120 comprises a wireless interface, LAN 130 comprises a wireless interface (not illustrated), and two-way client 100 is a portable computing device. By way of illustration, two-way analyzer is an Intermec 6400 Keypad Handheld Computer. However, the present invention is not so limited. As will be appreciated by those skilled in the art, other portable wireless computing devices may be used without departing from the scope of the present invention. By way of illustration and not as a limitation, two-way client 100 may be, without limitation, a laptop computer or a personal digital assistant equipped with a wireless interface.

Display 108 may be, without limitation, an LCD, a plasma, or other display device suitable for portable computing devices. Input 110 may be, without limitation, a mouse, a touch pad, a keypad, a keyboard, a touch-sensitive screen, a voice recognition system or other input device suitable for a portable computing device.

Two-way query interface 104 displays an interactive graphical display generated by two-way validation server 140. Two-way query interface 104 accepts a CST identifier that associates the two-way client 100 with a CST (not illustrated). The CST identifier is passed via processor 116, LAN interface 120, LAN 130, to two-way validation server 140.

Two-way validation server 140 may be, without limitation, located in a cable network headend, in a cable network data center, in a network operations center or other suitable location determined by the cable network operator. In an embodiment of the present invention, two-way validation server 140 comprises a two-way query processor 142, signature query library 144, job query library 146, two-way query library 148 and CPE state data query library 150. These libraries comprise instruction sets that are executed when a call is issued by two-way query processor 142.

According to an embodiment of the present invention, two-way query library 148 comprises instruction sets to acquire subscriber account information and to PING subscriber CPE units to determine a current two-way operational status.

According to an embodiment of the present invention, job query library 146 comprises instruction sets to acquire service requests assigned to a CST, to acquire details of a specific service request, to access a CST's profile information, and to determine whether a CST is qualified to answer an assigned service request.

According to an embodiment of the present invention, signature query library 144 comprises instruction sets to acquire the results of a two-way operational status test, to store the results of that test in appropriate network databases, and to apply a timestamp to the test results and store the timestamped test results in a subscriber datastore.

According to an embodiment of the present invention, CPE state data query library 150 comprises instruction sets to acquire the state data of a CPE unit. State data are acquired by two-way query processor 142 from the CPE unit.

Two-way query processor 142 accesses a technician datastore 170, a subscriber datastore 175, and a work order datastore 180.

Upon receipt of the CST identifier from two-way client 100, two-way query processor 142 retrieves a work order list (see FIG. 2, 200) associated with the identifier from the work order datastore 180 and returns it to display 108 of two-way client 100 via LAN interface 135, LAN 130, LAN interface 120, and processor 116. A work order comprises a subscriber identifier. In response to selection of the subscriber identifier, the two-way query processor 142 executes validation instructions to determine the two-way continuity of a CPE unit associated with the subscriber account identifier.

In an embodiment of the present invention, the CST identifier is associated with a profile stored in technician datastore 170 that comprises information relating to the CST to which the CST identifier is assigned. The profile comprises a skill level indicator indicative of the maintenance and/or installation work that the CST is qualified to perform. In an alternate embodiment, the CST identifier also reflects the skill level indicator.

In an embodiment of the present invention, two-way validation server 140 further comprises a result analyzer 152 and a display server 154. Result analyzer 152 reviews the data acquired from two-way query processor 142 and assigns graphical attributes to a subscriber CPE unit. According to an embodiment of the present invention, a CPE unit that exhibits two-way operability is assigned a first graphical attribute. A CPE unit that fails to exhibit two-way operability is assigned a second, distinguishing graphical attribute. By way of illustration and not as a limitation, a graphical attribute may be, without limitation, a display color, a display intensity, an object shape, and a display modulation, such as blinking or motion. A notation of the two-way performance of the CPE unit and an assigned graphical attribute are passed to display server 154, which returns an interactive graphical display to two-way query interface 104. Two-way query interface 104 then causes processor 116 to output the interactive graphical display to display 108.

Figure 2:
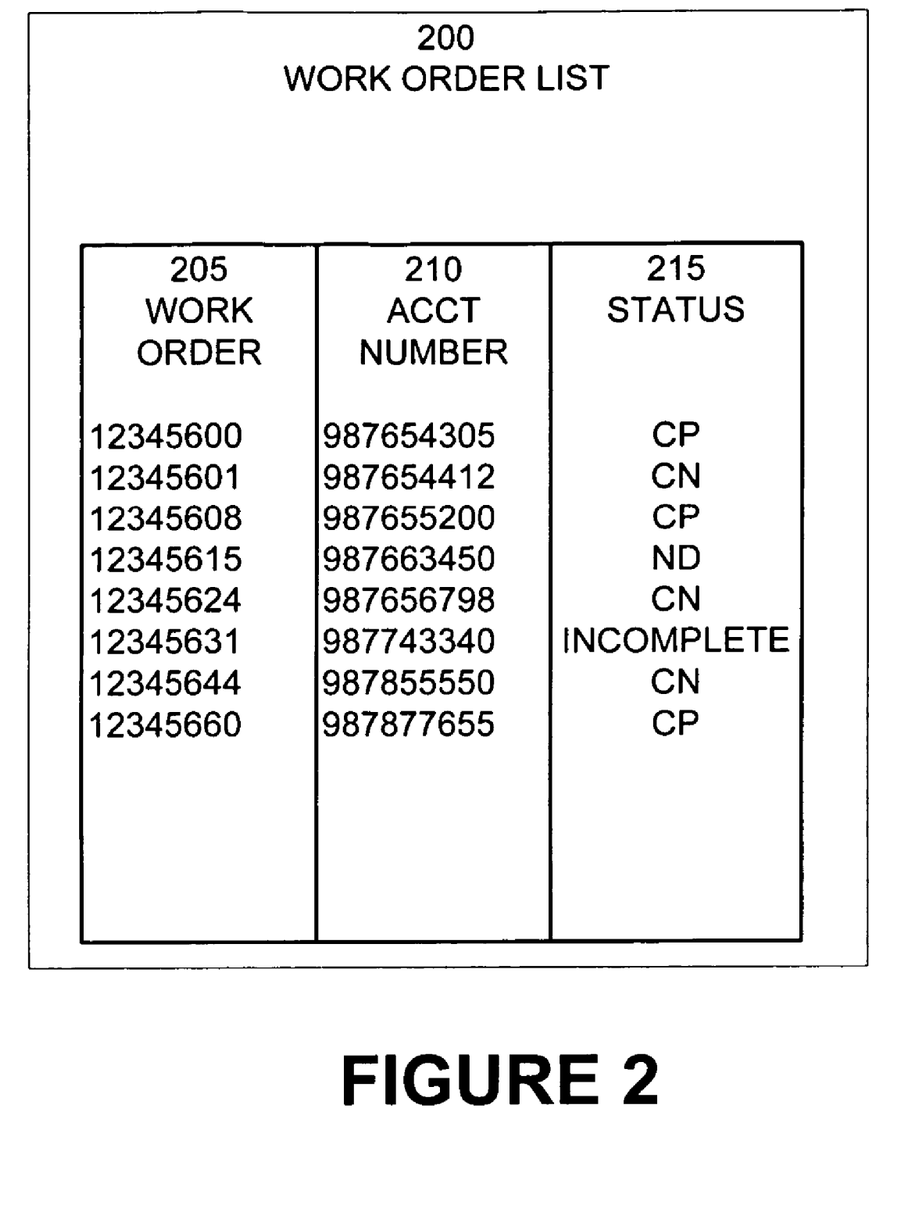
FIG. 2 illustrates a work order list according to an embodiment of the present invention.

FIG. 2 illustrates a work order list according to an embodiment of the present invention. Referring to FIG. 2, work order list 200 returned by two-way query processor 142 comprises a work order number 205, a subscriber account number 210, and a status code 215. As illustrated in FIG. 2, the status codes "CP," "CN," "ND," and incomplete are entered. According to an embodiment of the present invention, these codes have the following meaning:

CP—Completed jobs.
CN—Cancelled jobs.
ND—Jobs entered as not done.
Incomplete—Jobs currently assigned, but not yet completed (open jobs), and not assigned any other status code.

In an exemplary embodiment of the present invention, the work order number 205 is linked to a work record (see FIG. 3, 300) in work order datastore 180 and subscriber account number 210 is linked to a subscriber account record (not illustrated) in subscriber datastore 175. The two-way client 100 accepts user input from a CST via user input 110, allowing a CST to select a link to a particular work order number 205 or a particular subscriber account 210.

Figure 3:
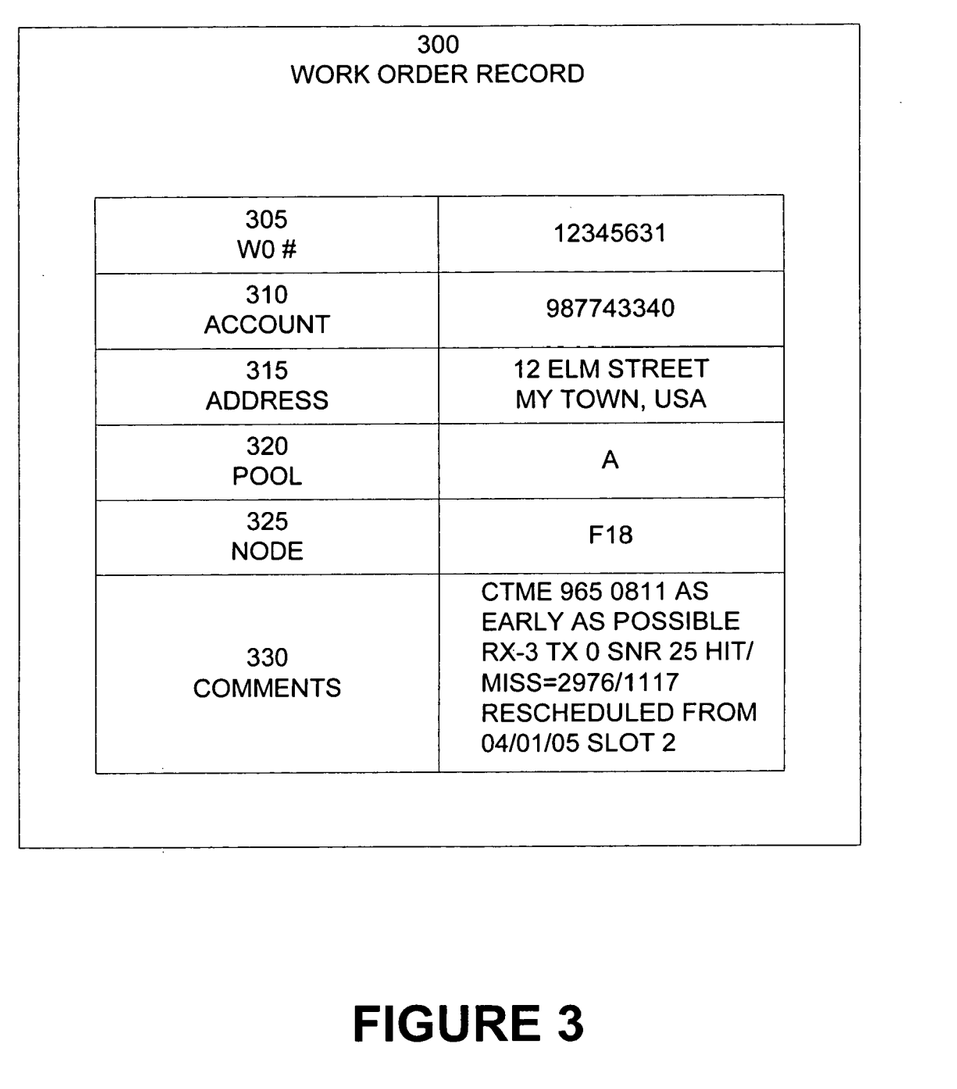
FIG. 3 illustrates a work order record according to an embodiment of the present invention.

FIG. 3 illustrates a work order record according to an embodiment of the present invention. Referring to FIG. 3, work order record 300 comprises a work order number 305, and a subscriber account number 310, a subscriber address 315, a pool number 320, a node identifier 325 indicative of the node on the cable network that is associated with the subscriber and through which subscriber communications are provided, and a comment block 330. As illustrated in FIG. 3, comment block comprises information relating to the two-way subscriber CPE units located at the customer premises.

Referring again to FIG. 1 and FIG. 3, in an embodiment of the present invention, two-way query processor 142 accesses the technician profile in technician datastore 170 and the work order 300 in work order datastore 180 to determine whether the CST is under-qualified, or alternatively, over-qualified to perform the work assigned to the CST with respect to a particular order. In an embodiment of the present invention, if the CST is under-qualified or over-qualified, the work order record 305 is flagged accordingly.

Referring again to FIG. 2, in yet another embodiment of the present invention, work order list 200 is presented in a descending order of priority. The priority may be, without limitation, established by the cable network operator based on the needs of the customer, the number of prior visits, route planning, and other factors.

Referring to FIGS. 1, 2 and 3, according to an exemplary embodiment of the present invention, when the account number (210 and 310 respectfully) is selected using user input 110, two-way client 100 initiates a two-way status check through TWQI 104. The request is received by processor 116 and sent to two-way validation server 140 where it is processed by two-way query processor 142. Two-way query processor 142 acquires data about the subscriber CPE units 192 and 194 from subscriber datastore 175, and fashions a PING message that is sent to subscriber CPE units 192 and 194 via the appropriate channel of cable network 185. By way of illustration and not as a limitation, if CPE unit 192 is a DAVIC-compliant STB, the PING message is sent via an out-of-band channel. If CPE unit 192 is a DOCSIS compliant STB or cable modem, the PING message is sent via a data channel. Two-way query processor 142 waits for a set period of time for a response from subscriber CPE unit 190.

Figure 4:
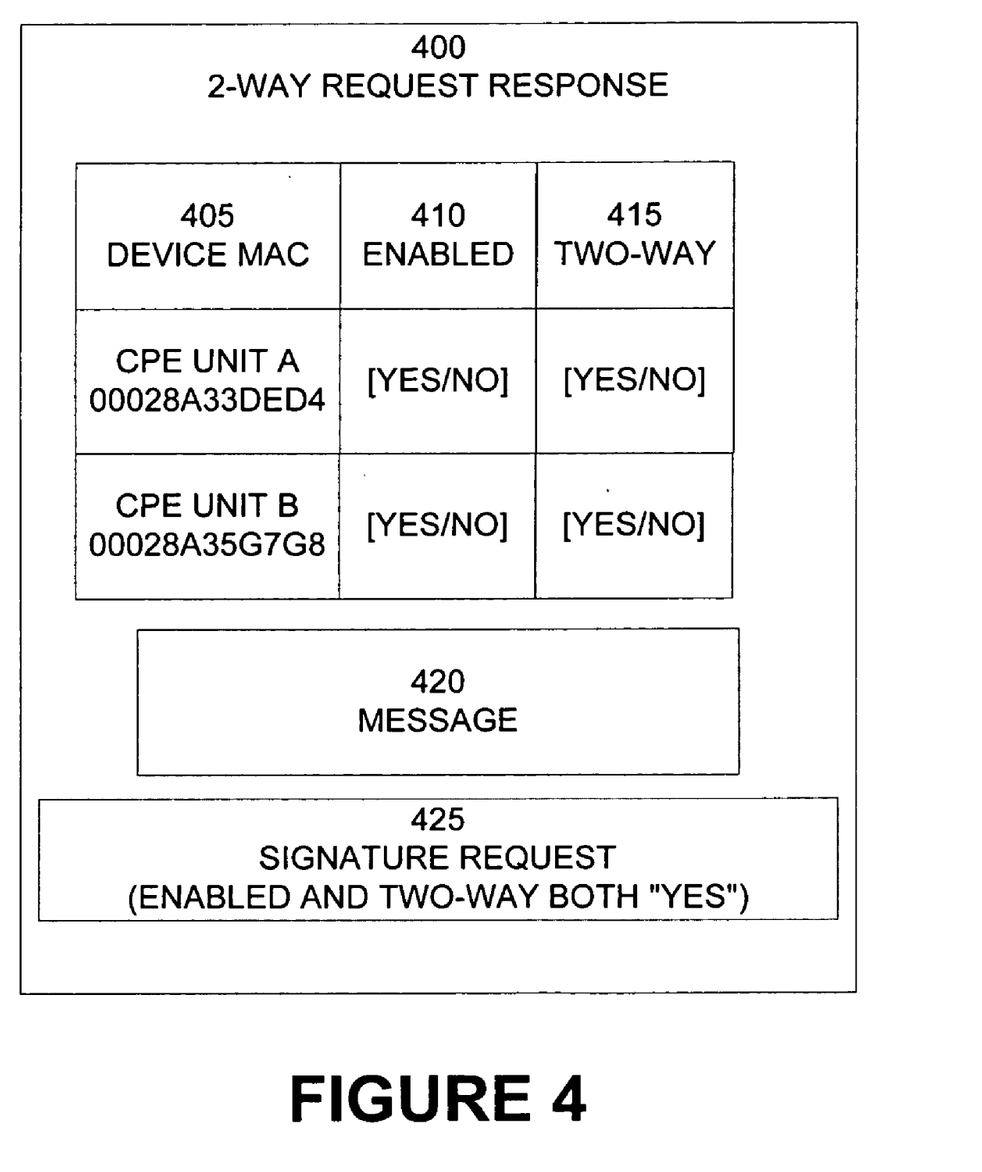
FIG. 4 illustrates a response to a two-way request according to an embodiment of the present invention.

FIG. 4 illustrates a response to a two-way request according to an embodiment of the present invention. Referring to FIG. 4, a two-way request response 400 comprises a device MAC field 405, an enabled field 410, and a two-way field 415. Enabled field 410 and two-way field 415 comprise a value that is either "yes" or "no," with the exception that a CPE unit may not have an enabled value of "no" and a two-way value of "yes." A CPE unit is "enabled" if the CPE unit is associated with the subscriber and is currently recognized by the cable system as "active." In an exemplary embodiment of the present invention, the CPE unit is associated with the subscriber using the CPE unit MAC address.

In an embodiment of the present invention, if a response is received from subscriber CPE unit (FIG. 1, 192) within the response period, the value of two-way field 415 associated with CPE unit (FIG. 1, 192) is set to "yes." If a response is not received from subscriber CPE unit (FIG. 1, 192) within the response period, the value of two-way field 415 associated with CPE unit (FIG. 1, 192) is set to "no." Similarly, the value of two-way field 415 for subscriber CPE unit (FIG. 1, 194) is determined and set.

In an embodiment of the present invention, the two-way request response 400 is assigned a graphical attribute depending on the value of two-way field 415. The graphical attribute determines the way in which two-way request response 400 is displayed by display 108. By way of illustration and not as a limitation, a graphical attribute is text color and the color in which two-way request response 400 is displayed is determined by the value of two-way field 415. In other embodiments of the present invention, the graphical attribute may be, without limitation, blinking/non-blinking, a background color, or a color highlight applied to the value fields of two-way request response 400.

According to an exemplary embodiment of the present invention, before a CST departs for a subscriber location (FIG. 1, 190) associated with a work order, the CST selects the subscriber account number from the work order list (FIG. 2, 200) or from work order record (FIG. 3, 300) and initiates a two-way request for the enabled subscriber CPE units (FIG. 1, 192 and 194). While only two subscriber CPE units are illustrated in FIG. 1, this is not meant as a limitation. Any number of two-way CPE units may be located within a customer's premises without departing from the scope of the present invention.

The pre-departure two-way request serves a number of purposes. By determining the two-way status of CPE units within a subscriber premises before departing for that location, the CST may determine whether the service request is valid. For example, a subscriber premises with multiple two-way CPE units, all of which have a two-way field value of "no" would suggest that the cause of the lack of two-way continuity is not the individual CPE units but a fault in some other network component common to those units, such as the house wiring or the external cable plant. Under these circumstances, the CST would check other fault systems of the cable network to determine whether other subscribers associated with the node associated with the subscriber (see, FIG. 3, 325) are also reporting problems. The CST may also determine what test equipment and/or replacement equipment is appropriate and/or necessary to respond to the subscriber's service request.

As previously noted, in an exemplary embodiment of the present invention, two-way client (see FIG. 1, 100) is a portable computing device that may be used to confirm the two-way continuity of subscriber CPE units following initial installation or following service on previously installed units. Upon completion of a work order, a CST again accesses the work order record 300 (see, FIG. 3) associated with the subscriber CPE units that have been installed or services and initiates a two-way request by selecting the customer account number 210 from the work order list 200 (see, FIG. 2) or the customer account number 310 from the work order record 300 (see, FIG. 3). Two-way request response 400 will be displayed on two-way client 100. When the value of two-way field 415 for each enabled two-way subscriber CPE unit associated with the subscriber account number is "yes," the CST will be provided the opportunity to "sign" the two-way response 400 by selecting a signature request line 425.

A signature request is a process that is managed by two-way query processor (FIG. 1, 142) using instruction sets held in signature query library (FIG. 1, 144). Two-way query processor (FIG. 1, 142) captures two-way request response 400 and determines the identity of the CST making the signature request by contacting the technician datastore (FIG. 1, 170). Two-way query processor (FIG. 1, 142) timestamps the two-way request response 400 and saves a copy of the response to the subscriber datastore (FIG. 1, 175) in the subscriber record (not illustrated) associated with the subscriber.

Figure 5:
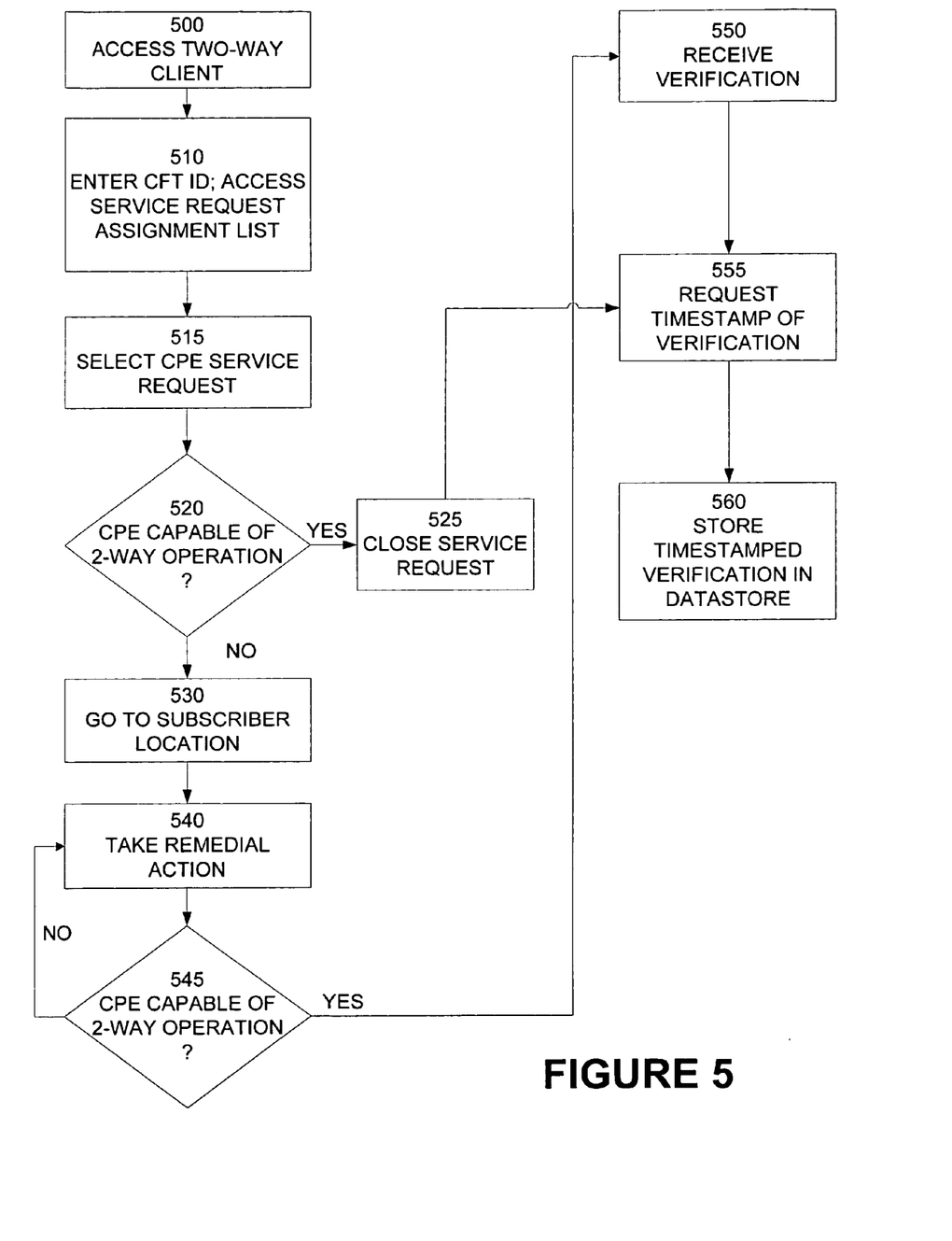
FIG. 5 illustrates a flow diagram of a process by which a cable service technician processes a service call according to an embodiment of the present invention.

FIG. 5 illustrates a flow diagram of a process by which a cable service technician processes a service call according to an embodiment of the present invention. A cable service technician (CST) accesses a remote two-way analyzer (two-way client, FIG. 1, 100) 500. The CST enters his or her CST identifier and accesses a list of CPE service requests assigned to the CST 510. The CST selects a CPE service request 515. The two-way client determines whether the CPE that is the subject of the service request is capable of two-way operation 520.

If the CPE that is the subject of the service request is capable of two-way operation, the service request is closed 525 and the CST requests a timestamped verification of the determination that the CPE is capable of two-way operation 555. The timestamped verification is then stored in a datastore in association with the subscriber and the CST 560. The timestamped verification is accessible from the datastore electronically.

If the CPE that is the subject of the service request is not capable of two-way operation, the CST travels to the subscriber location 530 and takes remedial action to correct the operation of the CPE 530.

The two-way client determines whether the CPE that is the subject of the service request is capable of two-way operation 545. If the CPE that is the subject of the service request is not capable of two-way operation, the CST continues to take remedial action 540. If the CPE is capable of two-way action, the CST requests a timestamped verification of the determination that the CPE is cable of two-way operation 555. The timestamped verification is then stored in a datastore in association with the subscriber and the CST 560. The timestamped verification is accessible from the datastore electronically.

In an exemplary embodiment of the present invention, the timestamped verification is stored in the company billing system.

Figure 6:
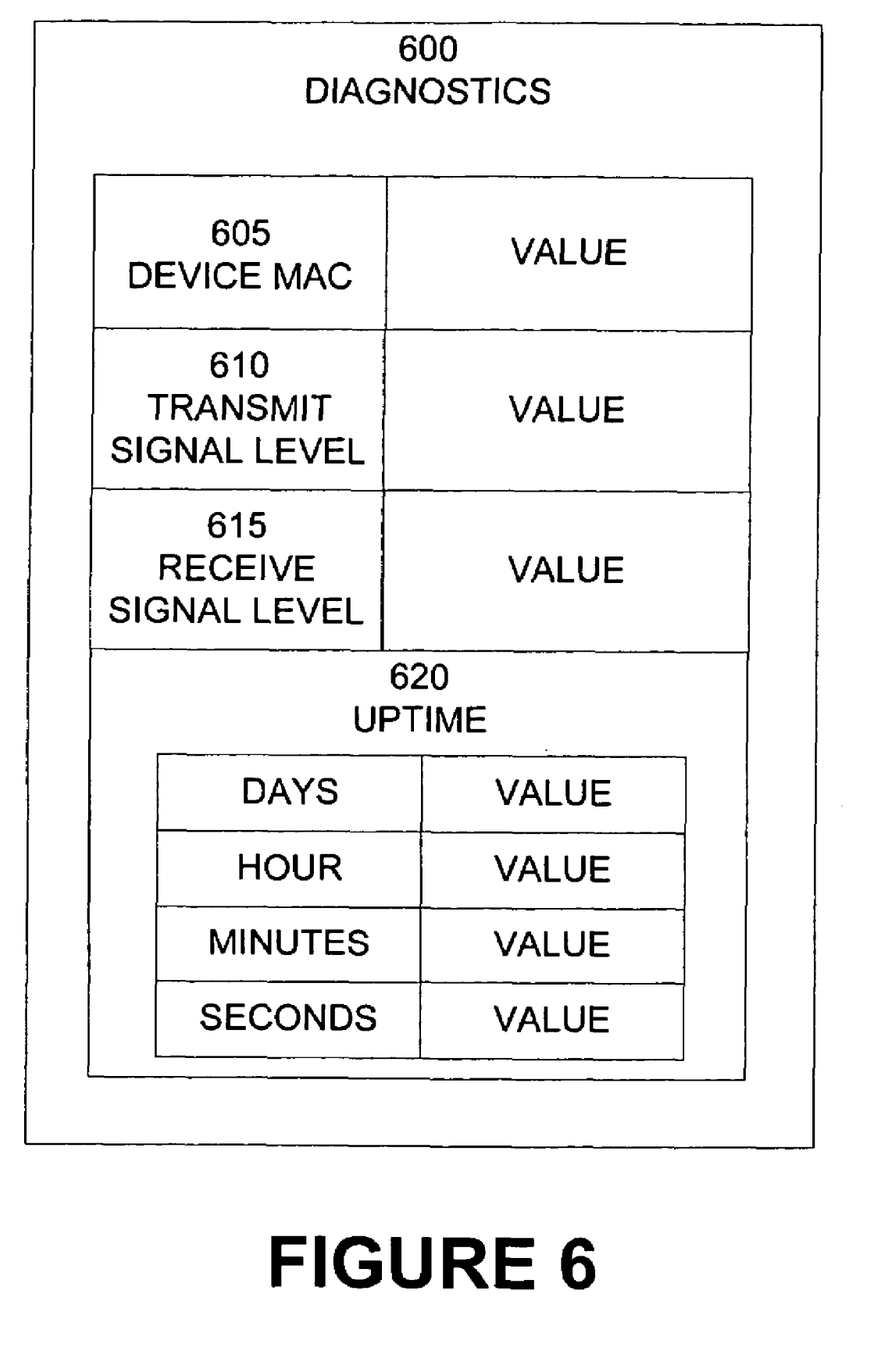
FIG. 6 illustrates a diagnostics data block according to an embodiment of the present invention.

FIG. 6 illustrates a diagnostics data block according to an embodiment of the present invention.

Referring to FIGS. 4 and 6, device MAC address 405 comprises a link to a diagnostics data block 600. According to an embodiment of the present invention, a CST may display the diagnostics data block 600 by selecting MAC address 405 of the CPE unit for which diagnostic information is desired.

Referring to FIG. 6, diagnostics data block 600 comprises diagnostic information relating to a CPE unit associated with the selected MAC address. The label, Device MAC 605, is associated with a value indicative of the MAC address selected by the CST. The label, transmit signal level 610, is associated with a value indicative of the transmit signal level of the CPE unit. The label, receive signal level 615, is associated with a value indicative of the receive signal level of the CPE unit. The label, uptime 620, is further associated with label value pairs Days, Hours, Minutes, and Seconds. These label value pairs describe the time since the CPE unit was last booted.

According to an embodiment of the present invention, the values associated with transmit signal level 610 and receive signal level 615 are assigned a graphical attribute indicative of whether the CPE unit exhibits two-way operation.

A system and method for confirming two-way operation of CPE in a cable network have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A system for determining a two-way operational status of a customer premises equipment (CPE) unit located at a customer's premises and connected to a hybrid fiber coax (HFC) cable network comprising:
   a local area network, wherein the local area network is distinct from the HFC cable network;
   a cable service technician ("CST") client remote from the customer's premises and connected to the local area network;
   a two-way query processor remote from the customer's premises and connected to the local area network, wherein the two-way query processor comprises instructions for:
      receiving a query from the CST client, wherein the query comprises a MAC address of the CPE unit; and
      in response to the receipt of the MAC address of the CPE unit, executing validation instructions to obtain a response indicative of a two-way operational status of the CPE unit associated with the MAC address of the CPE unit and located at the customer's premises; and
   a result analyzer remote from the customer's premises and connected to the two-way query processor, wherein the result analyzer comprises instructions for:
      receiving the response from the CPE unit;
      assigning the CPE unit a first two-way status value when the response from the CPE unit is indicative of two-way operational capability; and
      assigning the CPE unit a second two-way status value when the response from the CPE unit is not indicative of two-way operational capability; and
   a display server, wherein the display server comprises instructions for:
      receiving from the result analyzer a two-way status value selected from the group consisting of the first two-way status value and the second two-way status value; and
      communicating the two-way status value to the CST client via the local area network for display.

2. The system of claim 1, wherein the CPE unit is selected from the group consisting of a set top box, a cable modem, a media terminal adapter, and a digital video recorder.

3. The system of claim 1, wherein the validation instructions comprise instructions for issuing a PING command to the CPE unit.

4. The system of claim 3, wherein the response indicative of two-way operational capability of the CPE comprises a reply to the PING command.

5. The system of claim 3, wherein the response not indicative of two-way operational capability of the CPE comprises a receipt of a timeout of the PING command.

6. The system of claim 1, wherein the result analyzer further comprises instructions for providing the MAC address of the CPE unit and the assigned two-way status value to the display server, and wherein the display server further comprises instructions for:
- creating a two-way response record comprising the MAC address of the CPE unit and the two-way value; and
- sending the two-way response record to the CST client for display.

7. The system of claim 6, wherein the result analyzer further comprises instructions for:
- assigning a first graphical attribute to the MAC address of the CPE unit when the response from the CPE unit is indicative of two-way operational capability; and
- assigning a second graphical attribute to the MAC address of the CPE unit when the response from the CPE unit is not indicative of two-way operational capability; and
- wherein the instruction for creating a two-way response record further comprises instructions for creating the two-way response record in using a graphical attribute selected from the group consisting of the first graphical attribute and the second graphical attribute.

8. The system of claim 1 wherein the CST is associated with a CST identifier and wherein the system further comprises:
- a technician datastore, wherein the technician datastore comprises a CST profile associated with the CST identifier;
- a signature query library, wherein the signature query library comprises instructions for:
  - creating a signature record comprising the response of the CPE unit, the CST identifier, and a timestamp comprising a time when the response was created;
  - associating the signature record with a subscriber account identifier;
  - determining the identity of the CST making the signature request by accessing the CST profile associated with the CST identifier in the technician datastore; and
  - storing the signature record in a subscriber datastore; and
- wherein the two-way query processor further comprises instructions for:
  - receiving a signature record request from the CST client; and
  - executing the instructions from the signature query library.

9. The system of claim 8, wherein the two-way query processor further comprises instructions for:
- receiving a notification that the work order associated with the subscriber account identifier has been completed;
- determining whether the signature record request associated with the subscriber account identifier has been received from the CST client; and
- associating a warning with the CST identifier when the signature record request has not been received.

10. The system of claim 1, wherein the CST is associated with a CST identifier and wherein the display server further comprises instructions for:
- creating a list of work orders associated with the CST identifier; and
- sending the list of work orders to the CST client for display.

11. The system of claim 6, wherein the MAC address of the CPE unit comprises a link associating the MAC address with CPE diagnostic data comprising a CPE unit MAC address, a transmit signal level, a receive signal level, and uptime data.

12. The system of claim 11, wherein the display server further comprises instructions for:
- creating a diagnostic record from the CPE diagnostic data; and
- sending the diagnostic record to the CST client for display.

13. The system of claim 1 further comprising a job query library comprising qualification instructions, wherein the CST is associated with a CST identifier and wherein the two-way query processor further comprises instructions for:
- acquiring a profile associated with the CST identifier (the "CST profile"), wherein the CST profile comprises qualification data indicative of a skill level of the CST associated with the CST identifier; and
- acquiring a skill level requirement for the work order; and wherein the result analyzer further comprises instructions for:
- receiving the CST profile;
- receiving the skill level requirement for the work order;
- making a determination whether the skill level reflected in the CST profile is appropriate to the skill level requirement of the work order; and
- reassigning the work order when the skill level reflected in the CST profile is not appropriate to the skill level requirement of the work order.

14. A method for determining a two-way operational status of a CPE unit located at a customer's premises and connected to a hybrid fiber coax (HFC) cable network comprising:
- receiving at a two-way query processor a query from a cable service technician ("CST") client via a local area network, wherein the two-way query processor and the CST client are remote from the customer's premises, wherein the query comprises a MAC address of the CPE unit, and wherein the local area network is distinct from the HFC cable network;
- receiving at the two-way query processor the MAC address of the CPE unit from the CST client;
- in response to receipt of the MAC address of the CPE unit, executing validation instructions at the two-way query processor to obtain a response indicative of a two-way operational status of the CPE unit associated with the MAC address of the CPE unit and located at the customer's premises;
- receiving at the two-way query processor the response from the CPE unit and forwarding the response to a result analyzer, wherein the result analyzer is remote from the subscriber's premises;
- assigning at the result analyzer the CPE unit a first two-way status value indicative of two-way operational status when the response is indicative of two-way operational capability and assigning the CPE unit a second two-way status value when the response is not indicative of two-way operational capability; and
- communicating a two-way status value selected from the group consisting of the first two-way status value and the second two-way status value to the CST client via the local area network.

15. The method of claim 14, wherein the CPE unit is selected from the group consisting of a set top box, a cable modem, a media terminal adapter, and a digital video recorder.

16. The method of claim 14, wherein the validation instructions comprise instructions for issuing a PING command to the CPE unit.

17. The method of claim 16, wherein a response indicative of two-way operational capability of the CPE comprises a reply to the PING command.

18. The method of claim 16, wherein a response not indicative of two-way operational capability of the CPE comprises a receipt of a timeout of the PING command.

19. The method of claim 14 further comprising:
creating a two-way response record comprising the MAC address of the CPE unit and the two-way status value;
assigning a first graphical attribute to the MAC address of the CPE unit when the two-way status value is indicative of two-way operational capability; and
assigning a second graphical attribute to the MAC address of the CPE unit when the two-way status value is not indicative of two-way continuity operational capability of the CPE; and
displaying the two-way response record on the CST using a graphical attribute selected from the group consisting of the first graphical attribute and the second graphical attribute.

20. The method of claim 14 further comprising:
associating a CST identifier with the CST;
creating a signature record comprising the response of the CPE unit, the CST identifier, and a timestamp comprising a time when the response was created;
associating the signature record with a subscriber account identifier;
determining the identity of the CST making the signature request by accessing the CST profile associated with the CST identifier in the technician datastore; and
storing the signature record in a subscriber datastore.

21. The method of claim 20 further comprising:
receiving a notification that a work order associated with the subscriber account identifier has been completed;
determining whether the signature record request associated with the subscriber account identifier has been received from the CST client; and
associating a warning with the CST identifier when the signature record request has not been received.

22. The method of claim 14 further comprising:
associating a CST identifier with the CST;
creating a list of work orders associated with the CST identifier; and
displaying the list of work orders on the CST client.

23. The method of claim 14 further comprising:
creating a work order record from work order data; and
displaying the work order record on the CST client.

24. The method of claim 23, wherein work order data is selected from the group consisting of a work order identifier, the subscriber account identifier, a subscriber address, a VOD pool identifier, a cable node identifier, and a comment.

25. The method of claim 23, wherein the work order further comprises a work order identifier, and wherein the work order identifier comprises a work order link associating the work order to the work order record, and wherein the method further comprises accessing the work order record via the work order link.

26. The method of claim 14, wherein the method further comprises:
creating a diagnostic record from CPE diagnostic data; and
sending the diagnostic record to the CST client for display.

27. The method of claim 26, wherein CPE diagnostic data is selected from the MAC address of the CPE unit, a transmit signal level, a receive signal level, and uptime data.

28. The method of claim 26, wherein the CPE diagnostic data comprises the MAC address of the CPE unit, wherein MAC address of the CPE unit comprises a MAC link associating the MAC address of the CPE unit to the diagnostic record, and wherein the method further comprises accessing the diagnostic record from the CST client via the MAC link.

29. The method of claim 14, wherein the method further comprises:
associating a CST identifier with the CST;
acquiring a profile associated with the CST identifier (the "CST profile"), wherein the CST profile comprises qualification data indicative of a skill level of the CST associated with the CST identifier;
acquiring a skill level requirement for the work order;
making a determination whether the skill level reflected in the CST profile is appropriate to the skill level requirement of the work order; and
reassigning the work order when the skill level reflected in the CST profile is not appropriate to the skill level requirement of the work order.

* * * * *